Jan. 29, 1929.                   W. K. HOWE                    1,700,701
                                TRAIN CONTROL
                              Filed April 9, 1923           2 Sheets-Sheet 1

INVENTOR
Winthrop K. Howe,
BY
Neil A. Preston
his ATTORNEY

Jan. 29, 1929.  W. K. HOWE  1,700,701
TRAIN CONTROL
Filed April 9, 1923   2 Sheets-Sheet 2

INVENTOR
Winthrop K. Howe,
BY
Neil D. Preston,
his ATTORNEY

Patented Jan. 29, 1929.

UNITED STATES PATENT OFFICE.

WINTHROP K. HOWE, OF ROCHESTER, NEW YORK, ASSIGNOR TO GENERAL RAILWAY SIGNAL COMPANY, OF GATES, NEW YORK, A CORPORATION OF NEW YORK.

TRAIN CONTROL.

Application filed April 9, 1923. Serial No. 630,809.

This invention relates to automatic train control systems, and more particularly to a system including an engineer's brake valve which may be automatically operated and which is only at times entirely controllable by the engineer.

In order to stop a train by an automatic train control system, the usual air-brake system already on the train is preferably employed. To apply the brakes in the usual automatic air-brake system, it is necessary to vent air from the brake pipe. Since, however, the brake valve when in its usual running position continually feeds air into the brake pipe through the feed valve, it is advisable to do more than merely open the brake pipe to atmosphere to cause the proper pressure reduction therein, and therefore it is desirable to do both, vent the brake pipe and shut off main reservoir and feed valve pressure leading thereto.

In certain types of automatic train control systems, it is found desirable to cause an automatic application of the brakes by automatically actuating the usual engineer's brake valve, this being desirable for various reasons. For instance, if the engineer's brake valve is automatically actuated, the same ports which are used for a manual application may also be used for this automatic application; and further, no special provision need be made for cutting off main reservoir or feed valve pressure, since the engineer's brake valve is so constructed that such pressure is cut off in either the service or emergency brake applying position of this valve.

In certain types of train control systems, such as automatic train stops and speed control systems, it is desirable to make an unpreventable brake application so that the engineer may not forestall or prevent the braking; and consequently when the usual engineer's brake valve is automatically actuated to apply the brakes in a system of this type, it is necessary to provide means so that he cannot forcibly prevent its operation. In certain other types of systems, however, it is desirable to cause an automatic brake application only in the event that the engineer is dead or is not attending to his duties for some other reason. This latter type of system is commonly known as an auto-manual train control system. Similarly, there are certain types of train control systems which on certain parts of the railroad should conform to the auto-manual control; whereas on other parts thereof an unpreventable and irrevocable brake application should be automatically effected.

With the above and other considerations in mind, the principal objects and purposes of the present invention contemplate the provision of an automatic brake applying mechanism, which will be automatically operated by control influence transmitted from the trackway, which will cause, upon the reception of one kind of influence, a tentative or permissive brake application which may be forcibly prevented by the engineer (auto-manual), and which will cause, upon the reception of another kind of influence transmitted from the trackway, an unpreventable or absolute application of the brakes (automatic train stop or speed control).

More specifically, it is contemplated to provide means for actuating the valve proper of the usual engineer's brake valve which may be controlled by suitable devices on the car which are in turn governed by influences transmitted from the trackway; and to provide means also governed automatically by suitable car-carried and trackway devices for at times providing an operative connection between the engineer's brake valve handle and the valve proper of this engineer's valve; and at other times mechanically disconnecting the brake valve handle from the valve itself for movements of this handle toward the release position, and without interfering with the mechanical connection between the brake valve handle and the valve necessary for movement of this handle toward the service or emergency position to apply the brakes manually.

Other objects, purposes and characteristic features of the invention will appear as the description thereof progresses.

In describing the invention in detail, reference will be made to the accompanying drawings, in which:—

Fig. 2 is a side elevation of an engineer's brake valve operator embodying the present invention, portions thereof being shown in section to more clearly illustrate the operating mechanism;

Fig. 3 shows a section taken on the line

3—3, Fig. 2, as viewed in the direction of the arrows;

Figure 1:
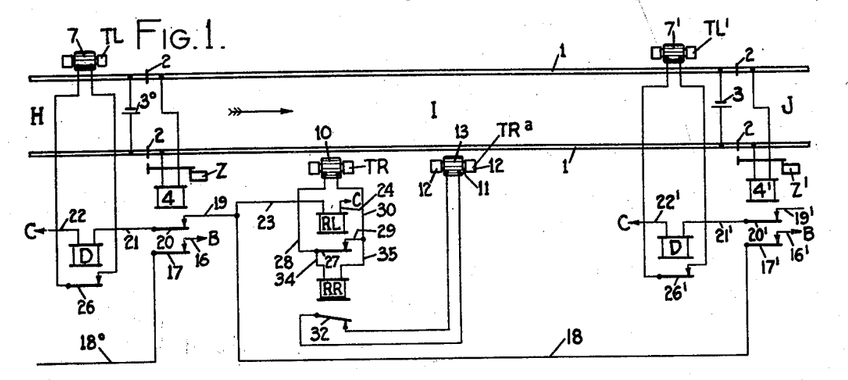
Figure 1 illustrates diagrammatically a section of a railway track with track circuits and devices of a train control system embodying the present invention.

*Track equipment.*—In describing the invention in detail, Fig. 1 of the drawings will first be described, and as a convenience in so doing certain features of operation will be assumed and more fully explained hereinafter. In Fig. 1 has been illustrated a trackway equipment provided with trackway devices on the lefthand side of the track near the entrance of the block, the direction of traffic being as indicated by the arrow, which if in their active condition will transmit a control influence to a passing vehicle; whereas the trackway devices shown at an intermediate point in the block on the righthand side of the trackway will transmit a control influence to a passing vehicle under dangerous traffic conditions only if a predetermined speed is exceeded when the vehicle passes these trackway devices.

In Fig. 1 have been illustrated the rails 1 of a section of a railway track divided by insulating joints 2 into blocks in the usual manner, the block I and the adjacent ends of blocks H and J being shown. Each of the blocks is provided with a track battery 3 and a track relay 4. Since the various blocks are the same, like parts thereof have been given the same reference characters with distinctive exponents. The present system is preferably used with fixed trackway signals. These signals may be of the semaphore, color light, position light or other suitable type; and for simplicity semaphore signals Z have been illustrated conventionally, without showing their well-known control circuits and devices.

Figures 4, 5:
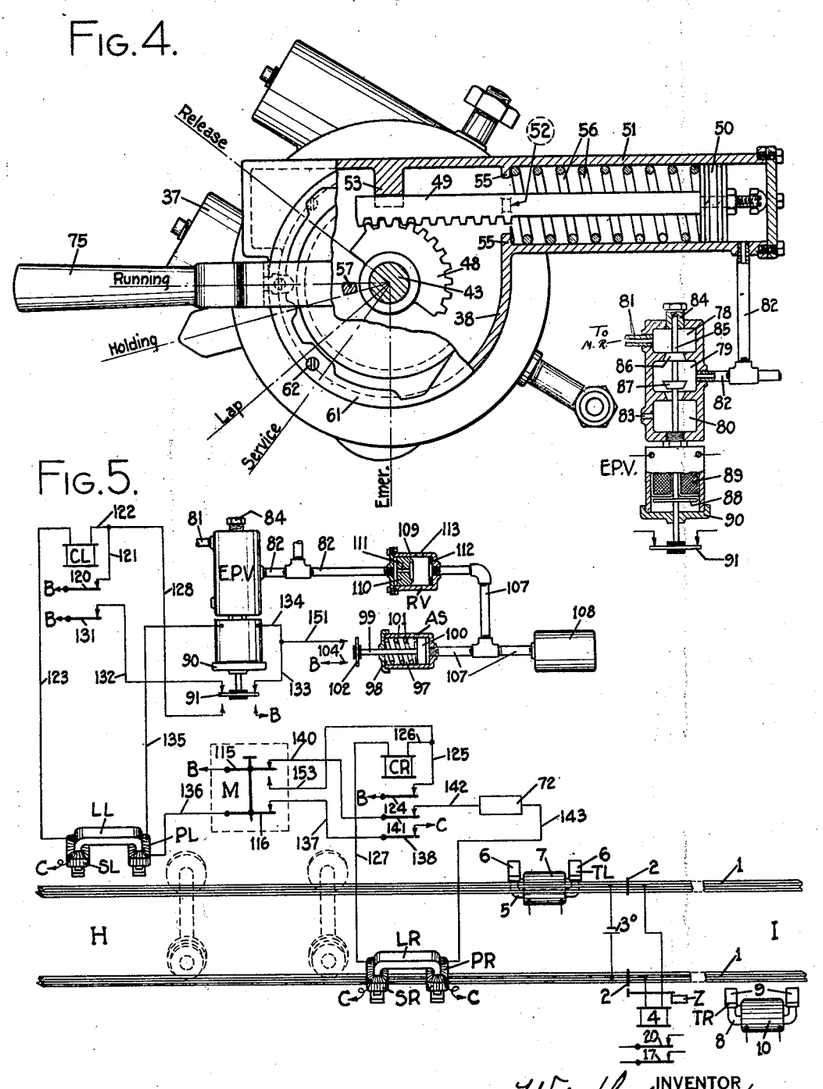
Fig. 4 illustrates a plan view of the engineer's brake valve and operator shown in Fig. 2, having certain parts thereof broken away to show the motor piston and certain parts of the valve operating mechanism, substantially as shown by the line 4—4, Fig. 2, as viewed in the direction of the arrows.
Fig. 5 is a diagrammatic view of car-carried apparatus of a train control system embodying the present invention, and showing the manner in which it is adapted to cooperate with the trackway apparatus shown in Fig. 1.

Near the entrance of each block and on the lefthand side of the trackway, is a track element TL comprising a U-shaped core 5, preferably constructed of a high grade of laminated transformer iron, and terminating in pole pieces 6 (see Fig. 5). On the core 5 is a coil 7. At an intermediate point in each block and on the righthand side of the trackway, is a similar element TR having a similar core 8 with pole pieces 9, and having a coil 10 on its back yoke. At a point a suitable distance in advance of the track element TR and also on the righthand side of the trackway, is an auxiliary track element $TR^a$, the spacing between these two track elements TR and $TR^a$ depending upon the speed limit to be enforced at this control point in the block. This auxiliary track element $TR^a$ comprises a similar U-shaped core 11 with pole pieces 12 and provided with a coil 13.

Near the entrance of this block is the usual distant relay D, which is controlled by the track relay of that block and the track relay of the block in advance. The circuit for energizing the distant relay D at the entrance of the block I may be traced as follows:—beginning at the terminal B of a suitable source of energy, such as a battery, wire $16^1$, front contact $17^1$ of track relay $4^1$, wires 18 and 19, front contact 20 of track relay 4, wire 21, winding of the distant relay D, wire 22 back to the common return wire C connected to the terminal of said source of energy.

At an intermediate point in the block is a line relay RL. The line relay RL of the block I is normally energized through a circuit which may be traced as follows:—beginning at the terminal B of said source of energy, wire $16^1$, front contact $17^1$ of track relay $4^1$, wires 18 and 23, winding of the line relay RL, wire 24 back to the common return wire C. The distant relay D is provided with a front contact 26, which if closed includes the coil 7 of the track element TL in a closed deenergized circuit of low resistance. The line relay RL is provided with a front contact 27, which if closed includes the coil 10 of the track element TR in a closed deenergized circuit of low resistance as follows:—beginning at the coil 10, wire 28, front contact 27 of the line relay RL, and wires 29 and 30 back to the coil 10.

A slow acting or retarded relay RR is connected in multiple with the coil 10 of the track element and the front contact 27 of the line relay RL. This slow acting relay RR is especially constructed to perform the function of a time element device, and is quick acting to pick up its armature and open its back contact 32, but is slow acting when deenergized, so that a certain amount of time must elapse after energization of this relay before its back contact 32 again closes. Any one of various well-known means for obtaining these time element features may be employed; and since the specific type of relay to be used is not material in the present invention, no specific means has been illustrated. Under normal conditions, that is, with the slow acting relay RR deenergized, its back contact 32 places the coil 13 of the auxiliary track element $TR^a$ in a closed deenergized circuit of low resistance.

Suitable car-carried elements, to be more fully described hereinafter, are suspended from each side of the railway vehicle in cooperative relation with the track elements. These car elements are so constructed that an inductive influence is transmitted to the moving vehicle if the cooperating track element has its coil open-circuited, but will not be transmitted if the cooperating track element has its coil closed in a circuit of preferably low resistance. It is also noted at this time that, since the coil of the track element TR is connected in circuit with the relay RR, the passage of a car element thereover will induce a current in the winding of said relay sufficient to actuate its contacts, without, however, causing an inductive influence to be transmitted to the vehicle, as in the case where the track element TL or TR$^a$ has its coil open-circuited.

Looking at Fig. 1, if either the block I or J is occupied, the energizing circuit for the distant relay D at the entrance of block I is broken, and the relay deenergized, thereby breaking the circuit for the coil 7 of the track element TL. The track element TL will thus be put into an influence transmitting condition, under either caution or danger traffic conditions ahead, that is, when either the block at the entrance of which it is placed, or the next block in advance thereof, is occupied.

Considering now the track elements TR and TR$^a$ located on the righthand side of the trackway, if the block in advance thereof is occupied, or is in a hazardous condition for some other reason, the energizing circuit for the line relay RL will be interrupted by the track relay of that block in advance. This deenergization of the line relay RL causes the front contact 27 thereof to open, thereby removing the very low resistance shunt for the relay RR, and leaving this relay unshunted in a circuit with the coil 10 of track element TR as follows:—beginning at the coil 10, wires 28 and 34, winding of the slow acting or retarded relay RR, wires 35 and 30 back to the coil 10 of the track element TR. The passage of a train by the track element TR, with contact 27 open, will cause a current to flow in the circuit just traced, picking up the armature or contact finger 32 of the slow acting relay RR. This circuit, however, is of such low impedance that it prevents the transmission of a control influence to the vehicle. As heretofore explained, a certain interval of time will be required for the back contact 32 of the slow acting or retarded relay RR to again close, this increment of time being for convenience assumed to be two seconds.

If now the train is moving at such a rate of speed that it will transverse the space between the track elements TR and TR$^a$ in less than this time (2 seconds), the back contact 32 will still be open and therefore the track element TR$^a$ will be in its effective condition and transmit a control influence to the vehicle. On the other hand, if the train consumes more than this amount of time in traveling this distance, the back contact 32 will have completed the low resistance circuit for the coil 13 before the train reaches this track element TR$^a$, and therefore no influence will be transmitted to the car-carried apparatus on the vehicle.

It is thus seen that track equipment of this invention will transmit a control influence to a car element located on the lefthand side of the vehicle, when either of two blocks in advance of this element are occupied; and will transmit an influence to another car element located on the other or righthand side of the vehicle, only if the block in advance of these elements is occupied or is dangerous for some other reason, and also providing that the train exceeds a predetermined average speed in passing from one element to another, this speed being dependent on the spacing of these elements and the timing of relay RR.

Figures 2, 3:
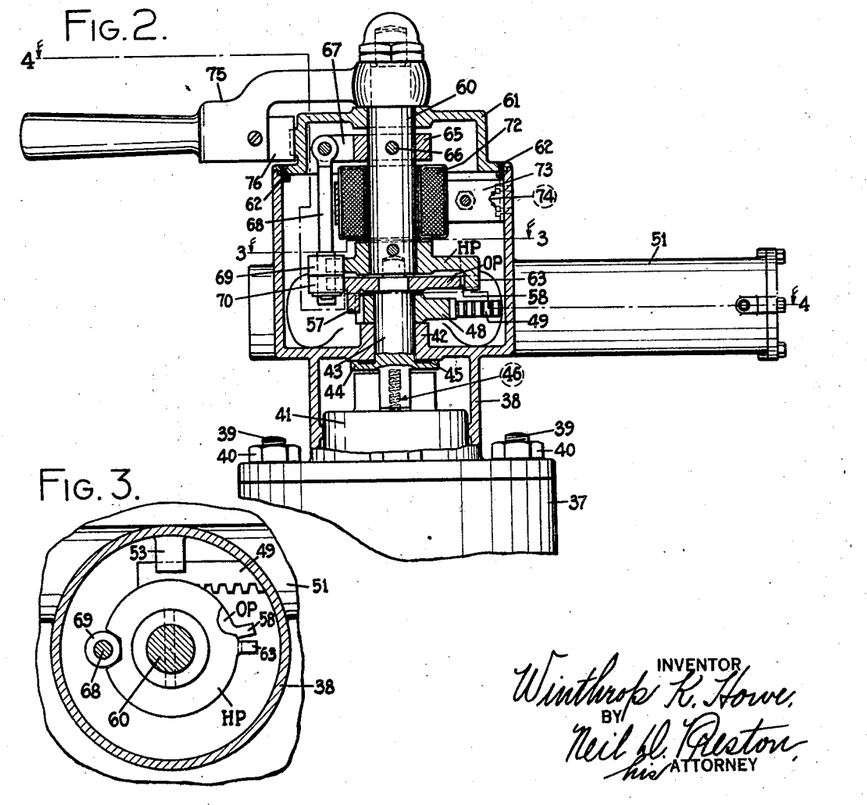

*Brake valve operator structure.*—In Figs. 2, 3 and 4 has been illustrated a portion of the usual engineer's brake valve having an automatic operator embodying this invention mechanically connected thereto. The usual brake valve casing 37 is shown as having its regular cover removed, and having a brake valve operator casing 38 fastened thereto by the usual bolts 39 and nuts 40 ordinarily used for fastening the regular cover. The usual rotary valve 41 is shown extending from the casing 37 into the bottom compartment of the operator casing 38. This casing 38 is provided with an inwardly extending flange terminating in a bearing 42. Journalled in this bearing 42 is the valve stem 43, which has an integral flange 44 bearing against the bottom side of said bearing. This flange 44 is provided with a circular recess containing a gasket 45. The lower portion of the valve stem 43 is substantially rectangular in cross-section and extends into the slot of the boss extending up from the rotary valve 41. This downwardly extending portion of the valve stem 43 is counterbored and contains a spring 46 which urges the valve stem upward, so that the gasket 45 rests against the bearing 42.

Loosely supported upon the valve stem 43 to turn thereon is a gear sector 48, more clearly illustrated in Fig. 4 of the drawings. This gear sector 48 is in operative engagement with a rack 49 fastened to the piston 50 supported in the cylinder 51 extending from the casing 38. This rack 49 is suitably guided by guide members 52 and 53 respectively. The cylinder 51 is provided with inwardly extending flanges 55, between which and the piston 50 is a helical compression spring 56. It will thus be seen that the action of the spring 56 causes the gear sector 48 to be maintained in the position illustrated, in the absence of fluid pressure in the cylinder 51.

A portion of the valve stem 43 extending above the sector 48 is squared, and has operatively connected thereto an operating plate OP. This plate OP is provided with a downwardly extending lug 57, which is adapted to be engaged by the edge of the gear sector 48 upon rotation of this gear sector in counter-clockwise direction. This plate OP is likewise provided with a radially extending projection 58 (see Fig. 3). Pivotally supported on the extreme upper end of the valve stem 43 is a handle stem 60, having its top end journaled in a cover 61 fastened to the top of the casing 38 by screws 62. Rigidly fastened to this handle stem 60, as by a cross pin, is a handle plate HP, which is provided with a downwardly extending lug 63 adapted to engage the extension 58 upon counter-clockwise rotation of the handle stem 60 (see Figs. 2 and 3).

Near the top of the handle stem 60 is a yoke 65 fastened thereto by a pin 66. This yoke 65 has a bifurcated extension 67, in which is pivotally supported the upper end of an armature 68. The lower end of this armature 68 is rounded and provided with rollers 69 and 70, which are adapted to engage notches (see Fig. 3) in the handle plate HP and the operating plate OP, respectively. On the handle stem 60 is a coil 72, which has been shown supported by a U-shaped bracket 73 fastened to the side of the casing 38 by cap screws 74. Upon energizaton of this coil, preferably by direct current, the armature 68 will be attracted and hold the rollers 69 and 70 in the notches in the plates HP and OP, thereby firmly locking these two plates together. This coil 72 and associated parts may for convenience be called a slot mechanism, because if this coil is deenergized, a connection between the plates OP and HP permitting the plate OP to be operated in one direction by the plate HP only results.

The projecting end of the handle stem 60 is squared in the usual manner and provided with the usual engineer's brake valve handle 75. This handle 75 is provided with a suitable spring latch member 76, which is adapted to engage suitable shoulders or notches in the running, holding, lap and service positions respectively, as illustrated in Fig. 4.

The supply of fluid pressure to the automatic brake valve operator just described is controlled by a suitable electro-pneumatic valve, such as illustrated and designated as a whole E. P. V. This valve E. P. V. comprises a chamber divided by partitions into compartments 78, 79 and 80. The upper compartment 78 is connected to main reservoir pressure by a pipe 81; the middle compartment 79 is connected by a pipe 82 to the cylinder 51 of the automatic brake valve operator; and the lower compartment 80 is connected by the port 83 to atmosphere. The top wall of the compartment 78 is drilled and threaded and contains a counterbored plug 84 to slidably support the upper end of the valve stem 85, which is provided with valves 86 and 87. This valve stem 85 extends down through the three compartments into a casing of an iron-clad magnet, having an armature 88 to which the valve stem 85 is suitably fastened and a magnet winding 89.

For certain purposes, this E. P. V. is provided with "stick" contacts which are closed when the magnet winding 89 is energized and which open when said winding is deenergized. In the simplified construction shown, the stem 85 extends through a hole in the lower non-magnetic cover 90 of the electro-magnet; and to the lower end of this stem 85 is fastened an insulated contact disc 91. This contact disc 91 is normally in engagement with stationary contacts, conventionally shown by arrows.

With the winding 89 of the E. P. V. energized, the valve 86 is closed and the valve 87 open, so that the cylinder 51 of the brake valve operator will be connected to atmosphere, as is obvious from the drawings.

*Permissive operation of the brake valve operator.*—The brake valve operator and the electro-pneumatic valve E. P. V. for controlling the same have been shown in their normal position, that is, with the coil 72 in the brake valve operator casing, and the winding 89 of the E. P. V. energized. If the engineer now wishes to make a brake application or release the brakes, he may do so by operating the brake valve handle 71 in the usual manner, an operating connection being present from the handle plate HP to the operating plate OP by the rollers 69 and 70.

Assume now that the winding 89 of the valve E. P. V. is for some reason deenergized, as hereinafter explained. Such deenergization of the winding 89 allows the valve stem 85 to drop by gravity, aided by the pressure on the valve 86, thereby seating the valve 87 and unseating the valve 86. This allows main reservoir pressure to flow from pipe 81 through compartments 78 and 79, and through the pipe 82 into the cylinder 51, thereby causing the piston 50 and rack 49 to move toward the left against the tension of the spring 56. Assuming the engineer's valve in the running position, the preliminary movement of the gear sector 48 through an angle, corresponding to the angle between the running and the release positions (see Fig. 4), will do nothing toward actuating the valve 41 of the engineer's brake valve. Further movement, however, causes the gear sector 48 to engage the lug 57, thereby causing rotation of the operating plate OP, and likewise the valve 41. Since the coil 72 in the operator casing 38 is still energized, this movement of the sector 48 likewise causes movement of the engineer's handles 71 because the plates HP and OP are still locked together.

If the engineer wishes to oppose this automatic brake application, he may do so by forcibly preventing movement of his brake valve handle 75, the parts being proportioned so that the pressure in the cylinder 51 is insufficient to overcome the force that may be exerted by the engineer. If the engineer does not oppose this movement of the brake valve and its handle it will be operated to the service position (see Fig. 4), at which position the end of the rack 49 will engage the wall of the casing 38. This automatic operation of the brake valve to the service position will cause an application of the air-brakes of the train in the usual manner.

After an automatic service brake application has been initiated, as just described, the engineer may make a more effective emergency brake application, by moving his brake valve handle 75 to the emergency position without any interference on the part of the automatic brake valve operator, the lug 57 being free to move counter-clockwise independent of the sector 48.

When the winding 89 of the E. P. V. is again energized, the valve 86 is again seated and the valve 87 is unseated, thereby shutting off main reservoir pressure and allowing the pressure in cylinder 51 to escape to atmosphere through the pipe 82, compartments 79 and 80 and port 83. The spring 56 now moves the rack 49 and gear sector 48 back to their normal position. Such movement of the rack and sector, however, does not change the position of the valve 41 itself, and it is necessary for the engineer to perform a positive act to release the brakes. Thus, an automatic brake application is not automatically released, but can only be released by manual intervention by the engineer.

*Absolute operation of the brake valve operator.*—Assume that the coil 72 and the winding 89 are both simultaneously deenergized. In this event, the rack 48 actuates the operating plate OP to the service position in the same manner as heretofore. The engineer, however, cannot prevent or forestall an automatic brake application in this case, because the coil 72 is also deenergized and any attempt to hold the handle 75 will cause the rollers 69 and 70 to disengage the notches in plates HP and OP. Thus, an unpreventable service brake application is effected when the coil 72 and the winding 89 are both deenergized.

After such a service application has been initiated the engineer may give an emergency brake application by moving his brake valve handle 75 to the emergency brake applying position. Although the plates HP and OP are not locked together by the armature 68 at this time, movement of the brake valve handle in the counter-clockwise direction toward the emergency position causes the lug 63 on the handle plate HP to engage the extension 58 of the operating plate, thereby forming an operating engagement between these plates as far as movement of the brake valve handle 75 in the counter-clockwise direction toward emergency is concerned.

If the coil 72 and the winding 89 are now again energized, the engineer may release the brakes by first moving his brake valve handle 75 to the proper position to allow the armature 68 to engage the notch of the operating plate OP in case the handle has been held; and after such alignment of parts, the armature 68 will be attracted and hold the rollers 69 and 70 in the notches, thereby again locking the plates HP and OP together and allowing the engineer to restore the valve to the release position.

*Car impulse receivers and relays.*—For co-operation with the track elements on the lefthand side and on the righthand side of the trackway respectively, car elements or receivers LL and LR are carried on opposite sides of the car. These car elements LL and LR are constructed the same; and each comprises a U-shaped core constructed of laminated transformer iron, and terminating in pole pieces. The car element LL, which is located on the lefthand side of the vehicle, is provided with a primary coil PL and a secondary coil SL; and similarly the car element LR, located on the righthand side of the vehicle, is provided with a primary coil PR and a secondary coil SR. These car elements are preferably mounted in a manner so that they have a definite relation with respect to the trackway, and are so located that they pass directly over their respective track elements heretofore described, the air gap between these car-carried and trackway devices being as small as operating conditions will permit.

Other devices included in the car-carried equipment comprise control relays CL and CR. These relays are especially constructed for the purpose for which they are used, are exceptionally sensitive and quick acting and are in practice well balanced so as not to be affected by jars and vibration. For convenience, they have merely been shown conventionally. These relays are provided with suitable contacts as will appear hereinafter.

The car-carried apparatus also includes a pneumatically operated switch AS, which consists of a cylinder 97 having one end closed and connected to a source of air under pressure, as more fully explained hereinafter. The other end of the cylinder 97 is closed by a cover 98, in which is slidably supported a piston rod 99 fastened to a piston 100. Between this piston 100 and the cover 98 is a spring 101, which, in the absence of pressure fluid in the cylinder, causes the piston 100 to assume the normal position shown. The other end of the piston rod 99 has fastened thereto an insulated contact disc 102. When the pressure admitted to this cylinder exceeds a predetermined pressure, corresponding to the strength of the spring 101, the contact disc 102 completes a circuit between stationary contacts conventionally shown as arrows.

This air-switch AS is connected by pipe 107 to a small capacity reservoir 108 which at times is connected through a restricted orifice or passage to the pipe 82 by which pressure is supplied for operating the engineer's brake valve, and which at other times is directly connected to atmosphere through a large exhaust port. These different connections are automatically made by the operation of a pressure operated device, conveniently termed the release valve RV. The release valve RV consists of a cylinder 109, one end of which is connected to the pipe 82 and the other end to pipe 107 leading to the capacity reservoir 108 and the air-switch AS. In the cylinder 109 of the release valve RV is a piston 110 fitting loosely enough therein to respond to differences in pressure on its opposite faces. Through the piston 110 is a relatively small passage or opening 111. One end of the piston 110 is formed with a circular ridge to make an air-tight seal with an annular packing or gasket 112 inside the cylinder at the end to which the pipe 107 is connected. In the wall of the cylinder 109 is a relatively large exhaust port 113 to atmosphere, which is opened to the pipe 107 with the piston 110 in the position shown, but which is blanked with the piston shifted to the opposite righthand position.

In order to permit restoration of the apparatus to normal after an automatic absolute brake application, a reset switch M is provided. This reset switch M, shown conventionally for convenience, is preferably enclosed in practice in a suitable casing (indicated by the dash lines), and is located on the car in such a position that it cannot be reached except by one standing on the ground. In other words, the reset switch M is preferably arranged so that the train must come to a stop before said switch can be operated. The casing for this reset switch M may, of course, be locked or otherwise protected, or various other expedients provided, the principal object being to prevent operation of this switch until the desired control of the train has been actually accomplished. As conventionally shown, this reset switch M comprises two switch arms or contact fingers 115 and 116 moved simultaneously and arranged to cooperate with normally closed and normally open contacts shown conventionally as arrows.

*Operation.*—In order to simplify the tracing of circuits, the letter B has been used to designate one terminal of a suitable source of direct current energy, such as a battery, and the letter C has been used to designate a common return wire leading to the other terminal of said source.

Under normal conditions, that is, with a vehicle equipped with the apparatus illustrated moving in a clear block, the control relay CL is energized by a circuit which may be traced as follows:—beginning at the terminal B of the battery, front contact 120 of relay CL, wires 121 and 122, winding of relay CL, wire 123, secondary coil SL of the car element LL back to the common return wire C. Similarly, the control relay CR is normally energized by a circuit which may be traced as follows:—beginning at B, front contact 124 of the control relay CR, wires 125 and 126, winding of the control relay CR, wire 127, secondary coil SR of the righthand car element LR back to the common return wire C.

With the control relays CL and CR energized, the winding of the valve E. P. V. and the primary coil PL of the car element LL are energized through a circuit which may be traced as follows:—beginning at the terminal B of the battery, front contact 131 of the control relay CL, wire 132, contact disc 91 of the E. P. V., wires 133 and 134, winding of the E. P. V., wire 135, primary coil PL of the car element LL, wire 136, lower switch arm 116 and its normally closed contact of the reset switch M, wire 137, front contact 138 of the control switch relay CR back to the common return wire C.

With the control relay CR energized, an energizing circuit for the slot winding 72 and the primary coil PR of the car element LR may be traced as follows:—beginning at B, upper switch arm 115 and its front contact, wire 140, front contact 141 of the control relay CR, wire 142, slot winding 72, wire 143, primary coil PR of the car element LR back to the common return wire C.

Assume that a train is in the block H and is approaching the block I and that the distant relay D is deenergized, because the block J is occupied by another train. As the lefthand car element LL passes over the lefthand track element TL, the reluctance of the magnetic circuit including the core of the car element LL is suddenly decreased and then again increased due to the presence of the track element TL. This sudden decrease and increase of reluctance causes a sudden change of flux through the secondary coil SL of the car element LL, due partly to a diversion of flux from leakage paths around the primary coil PL and partly due to an increase of the total flux passing through said primary coil PL. This sudden increase and decrease of flux through the secondary coil SL induces a single cycle of voltage therein corresponding to a single cycle of alternating current voltage. The secondary coil SL is preferably so connected to the battery that the first wave of this uni-cycle of E. M. F. opposes that of the battery and decreases the flow of current through the control relay CL to a point below its hold-up current, whereupon the front contacts 120 and 131 of the control relay CL open. While the current change in the relay CL is only momentary, current is cut off from its winding as soon as its front contact 120 opens, so that the relay remains deenergized. This deenergization of the control relay CL deenergizes the valve E. P. V. Since this valve is connected in a stick circuit, it will be permanently deenergized as soon as the front contacts 91 are broken, until again picked up or energized by some other means.

The operation of the valve E. P. V. drops the contact disk 91 on to its back contacts, closing the pick-up or restoring circuit for the relay CL from B, over wires 128 and 122, CL, SL, to C. The deenergization of the E. P. V. causes pressure to enter the cylinder 51 of the engineer's brake valve operator, which in turn applies the brakes unless the engineer forcibly prevents the movement of the handle 75, in a manner substantially as heretofore described.

The pressure applied and tending to cause movement of the brake valve to the brake applying position is automatically released after a given time in the following manner. The admission of pressure to the cylinder 51 and the E. P. V. also allows pressure to enter the cylinder 109 of the release valve RV. This causes the piston 110 to move to the right and blank the exhaust opening 113, thereby limiting, as distinguished from the rate of flow of pressure fluid from the reservoir 108 to atmosphere, the rate of flow of pressure into the capacity reservoir 108 (at atmospheric pressure) through the port 111 in the piston 110. This port 111 is of such a size that a predetermined time will be consumed before the capacity reservoir 108 will be filled to a pressure sufficient to cause the air-switch AS to complete a circuit by its contact 102. After this predetermined interval of time has expired, the contact 102 of the air-switch AS bridges its stationary contacts and completes a pick-up circuit for the valve E. P. V., which may be traced as follows:—beginning at the terminal B of the battery, contacts 104 closed, wires 151 and 134, winding of the E. P. V., wire 135, primary coil PL, wire 136, switch arm 116, wire 137, front contact 138 of the control relay CR and back to the common return wire C.

As soon as the device E. P. V. has been again energized, its contact disk 91 will again close its stick circuit and maintain it permanently energized. The energization of the device E. P. V. causes the rack 49 and sector 48 to move back to their normal position, as heretofore explained, and also connects the pipe 82 leading to the release valve RV to atmosphere, whereupon the pressure in the capacity reservoir 108 moves the piston 110 to the left back to its normal position, thereby allowing the capacity reservoir to discharge quickly through port 113 to atmosphere.

As the train continues through the block I and passes the track element TR, assuming that the block J is still occupied and therefore the line relay RL is deenergized, the righthand car element LR passes over the track element TR, and the current induced in the winding 10 of the track element TR by the passage of the car element LR thereover is conducted through the retarded relay RR (contact 27 being open). This flow of current causes the relay RR to pick up quickly for reasons heretofore mentioned, but it is not until after a certain time (assumed to be two seconds), that its back contact 32 again closes. As previously stated, the parts are so proportioned, particularly the winding of the relay RR, such that while this relay is energized the change of flux produced in the secondary coil SR in so doing is not sufficient to cause operation of the relay CR. The movement of the car by the track element TR under caution traffic conditions as assumed does not produce any action on the car, and merely results in picking up the relay RR on the track to mark the beginning of a time interval (say two seconds) which is finished when the back contacts of this relay RR again close.

The pairs of track elements TR and TR$^a$ are spaced apart along the track for a distance corresponding to the speed limit it is desired to enforce at this particular control point. For example, if a speed limit of 30 M. P. H. is wanted, and if the time taken for the relay RR to reclose its back contacts after the car passes the first track element TR is selected as two seconds, then the track elements TR and TR$^a$ will be spaced apart a distance of about eighty-eight feet, this distance corresponding to that traveled by a train in two seconds at a speed of 30 M. P. H.

With regard to the operation on the car, two possibilities require consideration. First, the speed of the car may not be above the speed limit for which the track elements are spaced; or second, the speed of the car may be above the speed limit. In the first instance, the car will have taken two seconds or more than two seconds in traveling from the track element TR to the track element TR$^a$, so that by the time the car reaches the latter track element, the back contact 32 of the relay RR has again closed and has placed the coil of this latter track element in a closed circuit of low resistance. Under such conditions, the car relay CR is not operated. This result is attributed to the action of the coil 13 of the track element TR$^a$ which, being in a closed circuit, tends to oppose or choke any large change of flux through the core of said track element, with the result that only a small change in flux takes place in the secondary coil SR and the voltage induced therein is not sufficient to cause operation of the relay CR. Putting it another way, it is thought that the coil 13 of the track element TR$^a$, when on closed circuit, acts as a choke or bucking coil and limits the amount and rate of change of flux to a value less than that occurring when this coil is on open circuit; and since the operating characteristics of the relay CR require at least a certain amount of reduction in the normal current flowing to cause its operation, said relay will not operate in one case but will in the other.

For the second possibility, suppose that the speed of the vehicle is above the speed limit for which the track elements TR and TR$^a$ are spaced. Under this assumption, the car element LR passes over the track element TR$^a$ before the relay RR has had time to close its back contacts, so that the coil 13 of the track element TR$^a$ is on open circuit and the relay CR is operated with the results hereinbefore explained. As the car element LR passes over the auxiliary track element TR$^a$ in this, its open-circuited condition, a momentary uni-cyclic voltage is generated and causes the control relay CR to be momentarily deenergized, in substantially the same manner as explaned in connection with the control relay CL. Since this control relay CR is connected in a stick circuit, its momentary deenergization will permanently deenergize it until it has been reset by some other means, that is, its momentary deenergization opens its front contact 124 and permanently interrupts its normal energizing circuit.

The deenergization of the control relay CR deenergizes the electro-pneumatic valve E. P. V., because of the opening of the front contact 138, and also deenergizes the slot winding 72 by reason of the opening of the front contact 141. The simultaneous deenergization of both the slot coil 72 and the winding of the valve E. P. V. causes an unpreventable and irrevocable brake application, as heretofore explained in connection with the operation of the brake valve operator.

In the event of the deenergization of the electro-pneumatic valve E. P. V. by the control relay CR, as just explained, this valve cannot again be reset by the air-switch AS, because the energizing circuit for said valve is interrupted at the front contact 138 of the control relay CR. The valve E. P. V., therefore, remains deenergized and the engineer's brake valve is kept in the service position until the relay CR is restored. In order to restore the relay CR, the reset switch M must be operated, and since this switch is accessible only from the ground, it follows that the brakes are applied and kept on until the train or vehicle has been brought to a stop.

After the train has been stopped, the engineer may press the button of the reset switch M. This closes a pick-up circuit for the control relay CR, which may be traced as follows:—beginning at the terminal B of the battery, switch arm 115 and its normally open contact of the reset switch M, wires 153 and 126, winding of the control relay CR, wire 127, secondary coil SR of the car element LR back to the common return wire C. Momentary closure of this reset switch M is sufficient to cause energization of the control relay CR, whereupon its front contact 124 closes and again completes its normal stick circuit. The energization of the control relay CR will again connect the winding of the E. P. V. to the common return wire C, and the air-switch AS, having closed in the meantime, again picks up the device E. P. V., which in turn will close its stick-up circuit. After resetting the car-carried apparatus in this manner the engineer may again proceed, subject to automatic control encountered at subsequent control points.

The reset switch M cannot be carelessly or maliciously left in the operated position, because the circuit for the valve E. P. V. would then be broken at the front contact of the switch arm 116, with the result that the brakes could not be released and the train proceed until and unless the reset switch had been returned to the normal position shown. Consequently, after each operation of the reset switch M, the person working it must return the switch to normal in order to permit the train to proceed, thereby assuring that this reset switch cannot be improperly manipulated and cannot be used to defeat the purposes of the system.

Assume now that a train is approaching the block I under clear traffic conditions, that is, with the blocks I and J unoccupied. The relay D is energized and the circuit for the coil of the track element TL is closed. As the car element LL now passes over the track element TL, having its coil 7 thus closed in a circuit of low resistance, no control influence will be transmitted to the control relay CL, for the reasons hereinbefore explained. Similarly, the relay RL is energized, since the block J is assumed to be unoccupied, and the coil 10 of the track element TR is in a closed circuit of low resistance and does not cause operation of the relay CR on the passing car. With the relay RL energized, its front contact 27 shunts the winding of the relay RR, so that this relay is not effectively energized as the car element passes over this track element, leaving the back contact 32 of the relay RR closed. Hence, irrespective of the time taken by the car in passing between the two track elements TR and TR$^a$, the train will always find the coil 13 of the track element TR$^a$ on closed circuit and no automatic operation occurs.

Consequently, under clear traffic conditions, there is no permissive or preventable brake application at the entrance to a block, or any speed limit enforced at the track elements TR and TR$^a$. In this connection, it should be understood that at any desired point along the track where it is wished to enforce a speed limit under clear traffic conditions for any reason, such as on a sharp curve, through yard limits, down grades, or other low speed territory, a pair of track elements TR and TR$^a$ may be spaced a suitable distance apart and controlled in the same way as shown in Fig. 1, except that the relay RL and its front contact 27 are omitted, leaving this pair of track elements always effective irrespective of the track conditions to enforce the desired speed limit. Such permanently active pairs of track elements on the right hand side of the track may be located at the appropriate distance back of an entrance of a block to limit the entering speed of trains into that block so as to conform with the braking distance that may be afforded by the length of the block.

While for simplicity only one pair of righthand elements TR and TR$^a$ for the block I have been shown, it should be understood that a number of such pairs of track elements may be located at several points in each block, the location and spacing of these elements being selected with due regard to the braking power of trains so as to afford the desired control.

It should also be understood that certain sections of the railroad may be equipped with lefthand track elements TL only, thereby providing permissive control throughout that territory; whereas other sections of the same railroad or other railroads may be equipped with pairs of righthand track elements TR and TR$^a$ only, thereby providing absolute enforcement of the desired predetermined speed limits; or certain sections of the same or different railroads may be equipped with both right and left hand elements, providing both the permissive and absolute speed control.

Among the characteristic features of this invention to which it is desired to direct particular attention, there is the provision of a brake applying means, which is controllable electrically so as to produce either a preventable or unpreventable brake application. While the specific disclosure shows such electrical control accomplished automatically from the trackway, the same distinction between a preventable and an unpreventable operation may be determined by a suitable manually adjustment or setting. For example, it sometimes happens that the same locomotive will be used in both freight and in passenger service at different times; and if, on account of the difficulty of making a safe and practical brake application automatically for freight service, it is desired to have permissive control for the locomotive while used in freight service, and absolute control while used in passenger service, the desired conversion may be made in a simple manner by providing for manual energization or deenergization of the slot coil 72. This and other adaptations or modifications of the parts specifically shown and described is considered to be so evident as not to require detail illustration; and it should be understood that this invention embraces the omission or recombining of the various parts shown and described in a number of different ways to provide varying degrees of control and the attainment of different functions and results.

Having thus shown and described only one specific embodiment of a novel brake valve operator, and having disclosed it in one particular system only, it is desired to have it understood that this has merely been done to illustrate an application of the invention and its mode of operation and that various modifications, changes and adaptations may be made without departing from the spirit or scope of the present invention or its mode of operation.

What is desired to be secured by Letters Patent of the United States, is:—

1. In an automatic train control system, the combination with the usual engineer's brake valve, of a handle, normally energized electrically controlled means for operatively connecting said handle to said brake valve for manually operating said valve, and automatic means for independently operating said valve.

2. In a brake applying apparatus, the combination with the usual engineer's brake valve, a handle, electrically controllable means which if energized mechanically connects said handle to said valve, and automatic means for moving said valve to the brake applying position.

3. In a brake applying apparatus, the combination with the usual engineer's brake valve, a stem of magnetic material pivotally supported over said valve and in alignment with the axis thereof, a handle fastened to said stem, a coil surrounding said stem, means associated with said coil for locking said stem to said valve when said winding is energized, and automatic means for moving said valve.

4. An automatic train control system comprising, the usual engineer's brake valve, automatic means controllable from the trackway in accordance with traffic conditions ahead for operating said valve, a handle for manually operating said valve, and other means controllable from the trackway which if actuated will disconnect said handle from said brake valve.

5. An automatic train control system comprising, the usual engineer's brake valve on a vehicle, a handle for operating said valve, automatic means controlled from the trackway for urging said brake valve to the brake applying position with a force that the engineer may effectively oppose by holding said handle thus effecting a permissive brake application, and automatic means controlled from the trackway for simultaneously operating said brake valve and interrupting the operative connection between said valve and handle, whereby an unpreventable brake application will be effected.

6. An automatic train control system for railways divided into blocks comprising, the usual engineer's brake valve, a handle for operating said valve, automatic means controlled from the trackway near the entrance of a block for urging said brake valve to the brake applying position with a force that the engineer may effectively oppose by holding said handle thus effecting a permissive brake application, and automatic means controlled from the trackway at a subsequent point in a block for simultaneously operating said brake valve and interrupting the operative connection between said valve and handle if the vehicle exceeds a predetermined speed limit, whereby an unpreventable brake application results due to such excessive speed.

7. An automatic train control system comprising, the usual engineer's brake valve, means for automatically operating said valve, apparatus partly on the vehicle and partly along the trackway for actuating said means to apply the brakes in a manner that the engineer may oppose and prevent a brake application, and other apparatus partly on the vehicle and partly along the trackway having its actuation depending upon the speed of the vehicle for actuating said means to effect a brake application which cannot be prevented by the engineer.

8. In an automatic train control system of the type in which control influences are transmitted from the trackway to the vehicle inductivly through an intervening air gap, the combination of a plurality of influence receiving means on a vehicle located to move over different paths along the trackway, one of said influence receiving means causing a tendency to apply the brakes if a control influence is received by said means which may be forcibly overcome by the engineer, and another of said influence receiving means moving along a different path along the trackway for causing an unpreventable application of the brakes when a control influence is received thereby.

9. An automatic train control system comprising, the usual engineer's brake valve, a handle, electrically operable means for operatively connecting said handle to said valve, electro-pneumatic means for moving said valve to a brake applying position by a force which may be effectively opposed by the engineer by holding said handle, and other means along the trackway for actuating both said electrically operated means and said pneumatic means to cause an unpreventable brake application.

10. An automatic train control system according to the preceding claim, wherein the last mentioned trackway means is only effective to operate both of said means if the speed of the vehicle exceeds a predetermined speed limit.

11. In an automatic train control system, the combination with the usual engineer's brake valve, a handle, electrically operable means for operatively coupling said handle to said valve, means automatically operable for moving said valve to a brake applying position by a force which may be effectively opposed by the engineer by holding said handle, whereby either a permissive or an absolute brake application may be effected dependent upon whether one or both of said means have been operated, and means effective after a time for releasing the effect of said automatic operated means only effective if a permissive brake application has been initiated.

12. Combined manual and automatic brake applying apparatus comprising, the usual engineer's brake valve, a handle pivotally connected to said valve and including interengaging means whereby said handle is always effective to move the valve in a brake applying direction, electrically operable means for locking said handle to said valve for movements in the brake releasing direction, and automatic means for actuating said valve to a brake applying position by a force which the engineer may effectively oppose by holding said handle.

13. In an automatic train control system, the combination with the usual engineer's brake valve, a handle, electrically operable means for operatively coupling said handle to said valve, means operable for moving said valve to a brake applying position by a force which may be effectively opposed by the engineer by holding said handle, whereby either a permissive or an absolute brake application may be effected depending upon whether one or both of said means have been operated, means effective after a time for releasing the effect of said automatically operable means only effective if a permissive brake application has been initiated, and other releasing means only accessible from the ground for releasing the effect of said automatic operable means if an absolute brake application has been initiated.

14. A train control system according to the preceding claim, wherein means is provided to maintain the automatic operable means effective while the manually operable releasing means is in its effective condition, whereby the brakes cannot be released by said manually operable release means until it is operated and is then again placed in its ineffective position.

15. Train control systems for railways comprising, car-carried apparatus including the usual engineer's brake valve, two rotatable members one of which is connected to the rotary valve of said brake valve and the other of which is connected to the handle of said brake valve, and electrically operated means governed by control means located along the trackway for locking said members together.

16. A train control system for railways comprising, a car-carried apparatus including the usual engineer's brake valve, a plurality of influence receiving means, means tending to actuate said valve to the brake applying position when an influence is received by one of said means, and unpreventably operating said brake valve when an influence is received by the other influence receiving means.

17. A train control system for railways comprising, apparatus on a vehicle for causing a brake application, means partly on the vehicle and partly along one path along the trackway for causing said apparatus to tend to apply the brakes in a manner so that the engineer may prevent its taking effect when an influence is received by said means, and means partly on the vehicle and partly along another path along the trackway for unpreventably applying the brakes if an influence is received by this last mentioned means.

18. A train control system comprising, the usual engineer's brake valve, a handle, electrically operable means for coupling said handle to said valve, power operated means for actuating said valve, and means partly on the vehicle and partly along the trackway for actuating said power operated means and for uncoupling said handle from said valve when the car passes a control point along the trackway at excessive speed.

19. Brake applying apparatus for train control systems acting on the usual air brake mechanism, comprising a normally energized device for effecting an application of the usual air brakes if de-energized by operating the usual engineer's brake valve, means accessible by the engineer whereby he may prevent such operation of the engineer's brake valve, and means controlled automatically from the trackway for rendering said last mentioned means ineffective to prevent such operation.

20. Car-carried apparatus for automatic train control systems comprising, a normally energized electro-responsive device which if de-energized effects an automatic brake application which may be prevented by the engineer, another normally energized electro-responsive device which if de-energized effects an automatic brake application which cannot be prevented by the engineer, and two separate influence communicating means each of which is adapted to de-energize one of said electro-responsive devices only upon the reception of a control influence from the trackway.

21. Car-carried apparatus for automatic train control systems comprising, a normally energized electro-responsive device which if de-energized effects an automatic brake application which may be prevented by the engineer, another normally energized electro-responsive device which if de-energized effects an automatic brake application which cannot be prevented by the engineer, and means for communicating two distinctive kinds of influences from the trackway the reception of one kind of which de-energizes the first mentioned electro-responsive device and the reception of the other kind of which de-energizes said another electro-responsive device.

22. Car-carried apparatus for automatic train control systems comprising, a normally energized electro-responsive device which if de-energized effects an automatic brake application which may be prevented by the engineer, another normally energized electro-responsive device which if de-energized effects an automatic brake application which cannot be prevented by the engineer, means for communicating two distinctive kinds of influences from the trackway the reception of one kind of which de-energizes the first mentioned device and the reception of the other kind of which de-energizes said another device, means for restoring the first mentioned device to its normal condition effective only a predetermined interval of time after said brake application has been effected, and means for restoring said another device to normal effective only after the train has been brought substantially to a stop.

23. Brake applying apparatus for automatic train control systems comprising, normally energized electrically operable means acting on the usual air brake system, which if operated, vents the brake pipe but permits the engineer to forcibly recharge the brake pipe, another normally energized electrically operable means which if de-energized prevents the engineer from forcibly preventing the brake application effected by said first mentioned electrically operable means when de-energized, and means controlled in response to distinctive control influences transmitted from the trackway for deenergizing the first mentioned electrically operable means alone or for de-energizing both said first mentioned electrically operable means and said another electrically operable means simultaneously.

24. Car-carried apparatus for automatic train control systems comprising, the usual engineer's brake valve, a stick relay having a stick circuit, an influence receiving coil in the stick circuit of said relay, a normally energized flux producing coil so associated with said receiving coil that the passage of said coils by suitable trackway apparatus when in its active condition produces a voltage in said receiving coil to de-energize said relay, means for applying the usual air brakes upon de-energization of said relay, and means for preventing the engineer from releasing the brakes by said engineer's brake valve if said flux producing coil is de-energized.

25. Car-carried apparatus for automatic train control systems comprising, a brake control device acting on the usual air brake system, means which if momentarily actuated causes said device to assume its active condition in which it vents the usual brake pipe to atmosphere, and means effective when the brake pipe has been vented for a predetermined period of time for returning said brake control device to its normal position including a differential piston which permits pressure fluid to enter a chamber through a restricted opening only when the pressure is higher on one side of said piston but permits the escape of pressure fluid from said chamber through a larger opening when the pressure is higher on the other side of said piston.

26. Brake setting appliance for applying the brakes of the usual air brake system for a predetermined period of time comprising a pneumatically operated brake valve, a normally energized electro-pneumatic means which if de-energized controls the flow of pressure fluid to a pipe leading to suitable means for operating said brake valve to actuate the same, and a pressure responsive device connected to said pipe through a restricted opening and effective a period of time after said electro-pneumatic means has been operated to restore said electro-pneumatic means to its normal condition.

27. Car-carried apparatus for automatic train control systems comprising, a brake setting appliance acting on the usual air brake system which if actuated vents the brake pipe and effects a brake application, the usual engineer's brake valve handle, restoring means accessible only from the ground for restoring said appliance to normal if placed in its active condition, and means for preventing the engineer from releasing the brakes by placing the usual engineer's brake valve handle in the brake releasing position effective while said restoring means is in its active condition, whereby the engineer is prevented from leaving said restoring means in its active condition permanently.

28. Car-carried apparatus for automatic train control systems comprising, a brake setting appliance acting on the usual air brake system which if actuated vents the brake pipe and effects a brake application, and means for restoring said brake setting device to its normal position effective only if both a predetermined period of time has elapsed since said appliance has been actuated to its brake applying position, and suitable means accessible only from the ground is manually operated.

29. An automatic train control system comprising, a brake setting appliance, car-carried influence receiving means, means for conditioning and actuating said appliance in a manner so that its operation may be prevented by the engineer or may not be prevented by the engineer respectively depending upon which of two distinctive control influences is transmitted from the trackway to said influence receiving means, and trackway means for transmitting distinctive control influences to said influence receiving means.

30. An automatic train control system comprising, a brake setting appliance, car-carried influence receiving means, means for conditioning and actuating said appliance in a manner so that its operation may be prevented by the engineer or may not be prevented by the engineer respectively depending upon which of two distinctive control influences is transmitted from the trackway to said influence receiving means, and independent trackway means located at different locations along the trackway for transmitting distinctive control influences to said influence receiving means.

31. Car-carried apparatus for automatic train control systems comprising, an engineer's brake valve, a brake valve actuator constructed so that it may either operate said brake valve so that the engineer can forcibly prevent its operation or operate it so that the engineer cannot forcibly prevent its operation, and two separate circuits for controlling said brake valve actuator, of which if one is opened an unpreventable brake application occurs and of which if the other circuit is opened a brake application occurs which may be prevented by the engineer.

32. A combined manual and automatic brake valve for controlling the usual pneumatic brakes of railway trains comprising, the usual engineer's brake valve casing, a rotary valve in said casing, a handle for operating said rotary valve manually, and automatic means for operating said rotary valve and handle simultaneously so that the engineer may prevent its operation by holding said handle or operating said valve independently of said handle dependent on the condition of a selecting device.

33. Car-carried apparatus for automatic train control systems comprising; brake control mechanism acting on the usual air brake system and causing a brake application when actuated; fluid pressure operated means for actuating said brake control mechanism through the medium of a pipe connecting the brake control mechanism and said means; and means effective if said mechanism has assumed its active condition for a predetermined period of time for restoring said mechanism to normal, including a pressure responsive device for effecting restoration of said mechanism, a reservoir, and means for permitting said reservoir to be charged and said pressure responsive device to be actuated after an interval of delay including differential pressure means functioning to vent said reservoir to atmosphere at a heavy rate if the pressure in said reservoir is higher than the pressure in said pipe and to allow said reservoir to be charged at a restricted rate if the pressure in said pipe is higher than the pressure in said reservoir.

34. In an automatic train control system, the combination with the usual engineer's brake valve, a rotary valve in the casing of the engineer's brake valve, a handle for operating said rotary valve manually, automatic means for actuating said rotary valve to a brake applying position in a manner so that the engineer by movement of said handle can prevent a brake application when passing a signal location under adverse traffic conditions, and automatic means for actuating said rotary valve to a brake applying position in a manner so that the engineer cannot prevent a brake application in spite of his effort to do so through the medium of said handle when the train is moving at excessive speed.

35. In railway traffic controlling apparatus comprising a train carried magnetizable core provided with two windings and means in the trackway for at times varying the reluctance of the magnetic circuit through said core, the combination of a relay, a magnet for controlling the brakes on the train, a circuit for said relay including a contact on the relay and one of said windings, and a circuit for said magnet including the other said winding and a contact of said relay.

36. In railway traffic controlling apparatus comprising a train carried magnetizable core provided with two windings and means in the trackway for at times varying the reluctance of the magnetic circuit through said core, the combination of a relay, a magnet for controlling the brakes on the train, a circuit for said relay including a front contact of the relay and one of said windings, and a circuit for said magnet including the other said winding and a front contact of said relay.

37. In railway traffic controlling apparatus comprising a train carried magnetizable core provided with two windings and means in the trackway for at times varying the reluctance of the magnetic circuit through said core, the combination of a relay, a magnet for controlling the brakes on the train, a source of direct current, a circuit for said magnet including said source and one of said windings and controlled by a contact of said relay; a circuit for said relay including said source, the other said winding, and a front contact on said relay; a manually controlled circuit controller, and a shunt around said front contact controlled by said circuit controller.

38. In railway traffic controlling apparatus comprising a train carried magnetizable core provided with two windings and means in the trackway for at times varying the reluctance of the magnetic circuit through said core, the combination of a relay, a magnet for controlling the brakes on the train, a source of direct current, a circuit for said magnet including said source and one of said windings and controlled by a contact of said relay; a circuit for said relay including said source, the other said winding, and a front contact on said relay; a manually controlled circuit controller; and a second circuit for said relay including said source, said other winding, and a contact of said circuit controller.

In testimony whereof I hereby affix my signature.

WINTHROP K. HOWE.